(12) United States Patent
Tugnawat et al.

(10) Patent No.: US 12,192,802 B2
(45) Date of Patent: Jan. 7, 2025

(54) CONFORMANCE TESTING OF USER EQUIPMENT ASSISTANCE INFORMATION

(71) Applicant: QUALCOMM Incorporated, San Diego, CA (US)

(72) Inventors: Yogesh Tugnawat, San Diego, CA (US); Taran Dhuppad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/647,914

(22) Filed: Jan. 13, 2022

(65) Prior Publication Data

US 2022/0256369 A1 Aug. 11, 2022

Related U.S. Application Data

(60) Provisional application No. 63/199,997, filed on Feb. 8, 2021.

(51) Int. Cl.
  *H04W 24/06* (2009.01)
  *H04W 4/12* (2009.01)
  *H04W 76/20* (2018.01)
  *H04W 92/18* (2009.01)

(52) U.S. Cl.
  CPC .............. *H04W 24/06* (2013.01); *H04W 4/12* (2013.01); *H04W 76/20* (2018.02); *H04W 92/18* (2013.01)

(58) Field of Classification Search
  None
  See application file for complete search history.

(56) References Cited

U.S. PATENT DOCUMENTS

| | | | | |
|---|---|---|---|---|
| 2011/0269402 A1* | 11/2011 | Yi | ...................... | H04W 24/08 455/67.11 |
| 2016/0021672 A1* | 1/2016 | Delsol | ................ | H04W 72/542 455/450 |
| 2019/0254104 A1* | 8/2019 | Gurumoorthy | ........ | H04W 76/27 |
| 2022/0159568 A1* | 5/2022 | Kim | ..................... | H04W 72/21 |
| 2023/0014303 A1* | 1/2023 | Di Girolamo | ........ | H04W 72/20 |
| 2023/0180128 A1* | 6/2023 | Fang | ................ | H04W 52/0277 370/318 |

FOREIGN PATENT DOCUMENTS

CA 2644528 A1 9/2007

* cited by examiner

*Primary Examiner* — Pamit Kaur
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a base station, a request message indicating that the UE is to set a parameter of a UE assistance information message to a particular value, wherein the particular value indicates a preference for the parameter that is unrelated to an actual preference of the UE. The UE may transmit, to the base station and based at least in part on the request message, the UE assistance information message having the parameter set to the particular value. Numerous other aspects are described.

30 Claims, 7 Drawing Sheets

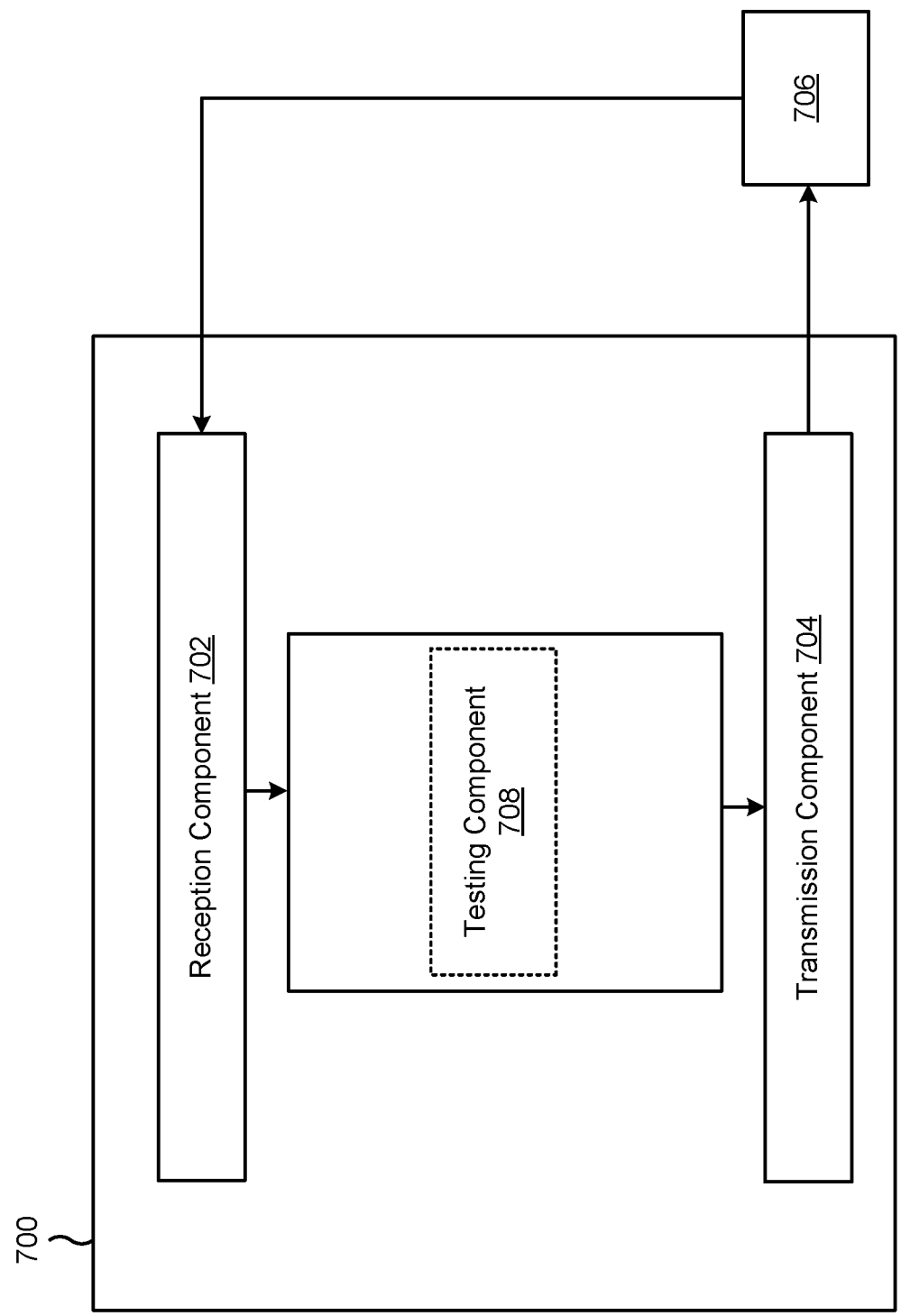

CONFORMANCE TESTING OF USER EQUIPMENT ASSISTANCE INFORMATION

CROSS-REFERENCE TO RELATED APPLICATION

This patent application claims priority to U.S. Provisional Patent Application No. 63/199,997, filed on Feb. 8, 2021, entitled "CONFORMANCE TESTING OF USER EQUIPMENT ASSISTANCE INFORMATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for conformance testing of user equipment (UE) assistance information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the memory and the one or more processors configured to: receive, from a base station, a request message indicating that the UE is to set a parameter of a UE assistance information message to a particular value, wherein the particular value indicates a preference for the parameter that is unrelated to an actual preference of the UE; and transmit, to the base station and based at least in part on the request message, the UE assistance information message having the parameter set to the particular value.

In some aspects, a base station for wireless communication includes a memory and one or more processors coupled to the memory, the memory and the one or more processors configured to: transmit, to a UE, a request message indicating that the UE is to set a parameter of a UE assistance information message to a particular value, wherein the particular value indicates a preference for the parameter that is unrelated to an actual preference of the UE; and receive, from the UE and based at least in part on the request message, the UE assistance information message having the parameter set to the particular value.

In some aspects, a method of wireless communication performed by a UE includes receiving, from a base station, a request message indicating that the UE is to set a parameter of a UE assistance information message to a particular value, wherein the particular value indicates a preference for the parameter that is unrelated to an actual preference of the UE; and transmitting, to the base station and based at least in part on the request message, the UE assistance information message having the parameter set to the particular value.

In some aspects, a method of wireless communication performed by a base station includes transmitting, to a UE, a request message indicating that the UE is to set a parameter of a UE assistance information message to a particular value, wherein the particular value indicates a preference for the parameter that is unrelated to an actual preference of the UE; and receiving, from the UE and based at least in part on the request message, the UE assistance information message having the parameter set to the particular value.

In some aspects, an apparatus for wireless communication includes means for receiving, from a base station, a request message indicating that the apparatus is to set a parameter of a UE assistance information message to a particular value, wherein the particular value indicates a preference for the parameter that is unrelated to an actual preference of the apparatus; and means for transmitting, to the base station and based at least in part on the request message, the UE assistance information message having the parameter set to the particular value.

In some aspects, an apparatus for wireless communication includes means for transmitting, to a UE, a request message indicating that the UE is to set a parameter of a UE assistance information message to a particular value, wherein the particular value indicates a preference for the parameter that is unrelated to an actual preference of the UE; and means for receiving, from the UE and based at least in part on the request message, the UE assistance information message having the parameter set to the particular value.

In some aspects, a non-transitory computer-readable medium storing a set of instructions for wireless communication includes one or more instructions that, when executed by one or more processors of a UE, cause the UE to: receive, from a base station, a request message indicating that the UE is to set a parameter of a UE assistance information message to a particular value, wherein the particular value indicates a preference for the parameter that is unrelated to an actual preference of the UE; and transmit, to the base station and based at least in part on the request message, the UE assistance information message having the parameter set to the particular value.

In some aspects, a non-transitory computer-readable medium storing a set of instructions for wireless communication includes one or more instructions that, when executed by one or more processors of a base station, cause the base station to: transmit, to a UE, a request message indicating that the UE is to set a parameter of a UE assistance information message to a particular value, wherein the particular value indicates a preference for the parameter that is unrelated to an actual preference of the UE; and receive, from the UE and based at least in part on the request message, the UE assistance information message having the parameter set to the particular value.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-7 are diagrams of example apparatuses for wireless communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
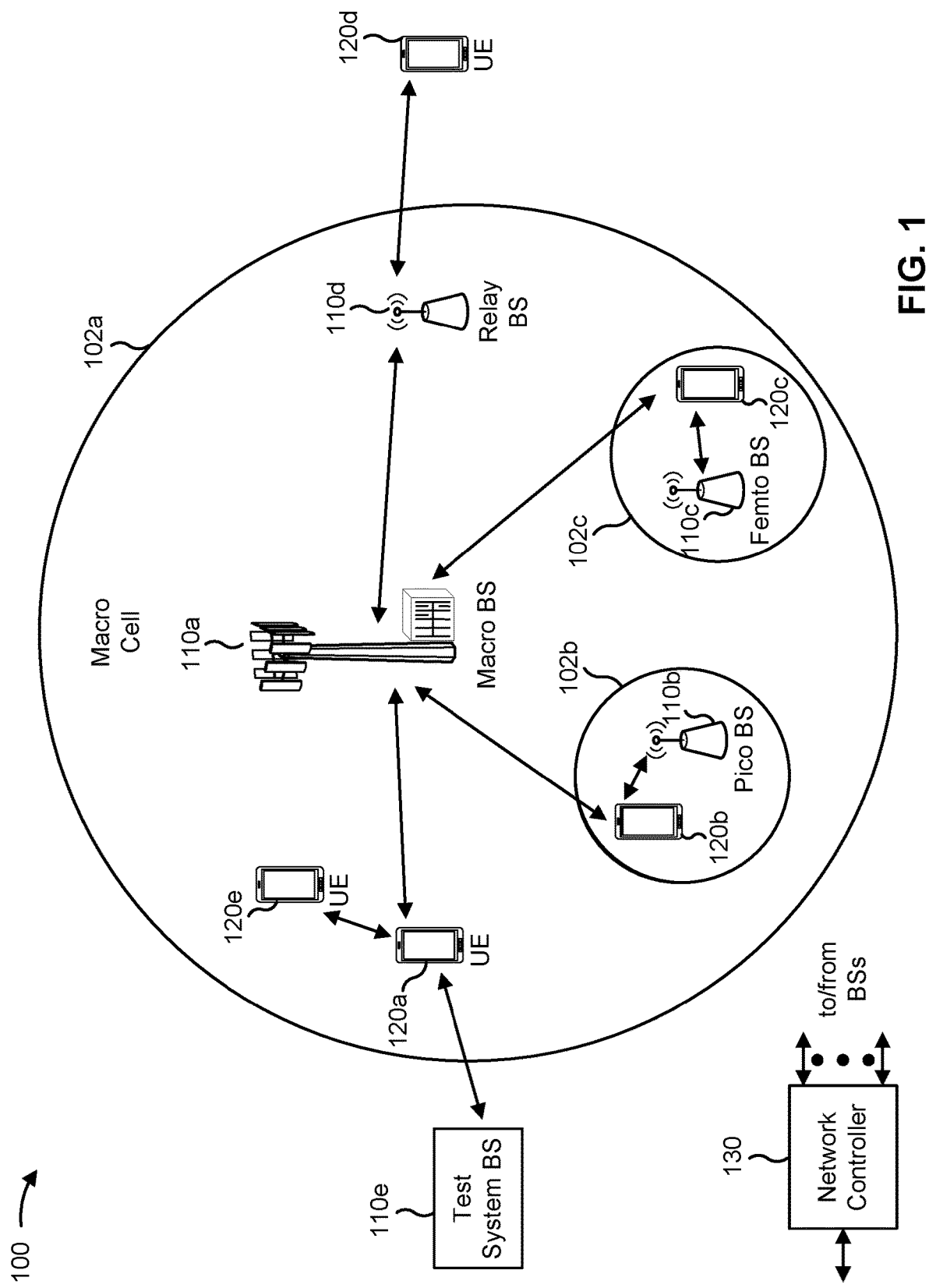
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A test system BS 110e may be connected to a UE 120 via a wireless connection and/or a wired connection. The test system BS 110e may be a test system (also referred to as a simulation system) that provides conformance testing for one or more communication standards (e.g., 3GPP technical specifications). The test system BS 110e may simulate the functions of a base station 110. In some examples, the test system BS 110e may be a component of a base station 110.

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
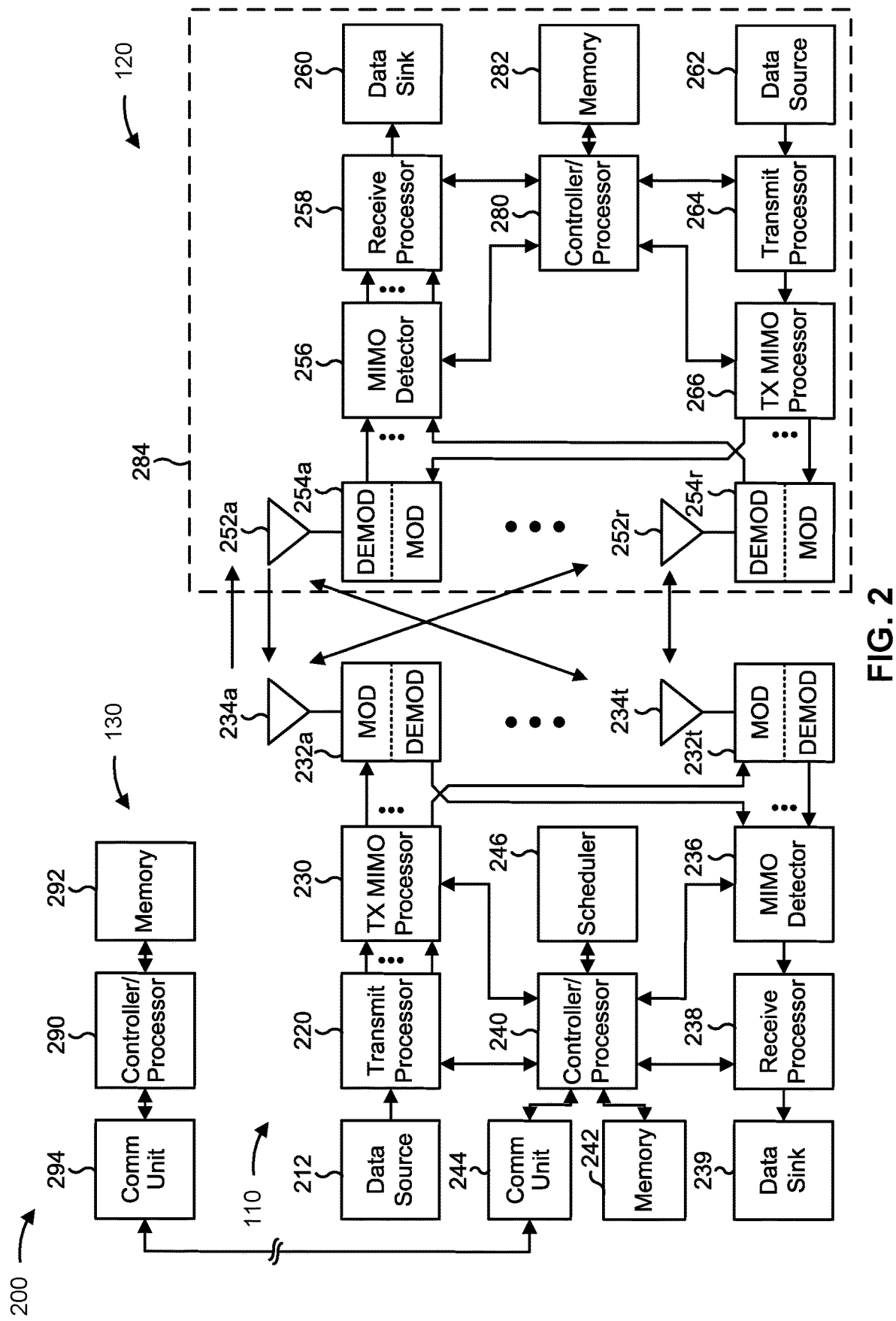
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

Controller/processor 240 of base station 110, controller/processor 280 of UE 120, and/or any other component(s) of FIG. 2 may perform one or more techniques associated with conformance testing of UE assistance information, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, the UE includes means for receiving (e.g., using antenna 252, DEMOD 254, MIMO detector 256, receive processor 258, controller/processor 280, memory 282, or the like), from a base station, a request message indicating that the UE is to set a parameter of a UE assistance information message to a particular value, where the particular value indicates a preference for the parameter that is unrelated to an actual preference of the UE; and/or means for transmitting (e.g., using controller/processor 280, transmit processor 264, TX MIMO processor 266, MOD 254, antenna 252, memory 282, or the like), to the base station and based at least in part on the request message, the UE assistance information message having the parameter set to the particular value. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting (e.g., using controller/processor 280, transmit processor 264, TX MIMO processor 266, MOD 254, antenna 252, memory 282, or the like) a response message providing confirmation that the UE is to set the parameter of the UE assistance information message to the particular value. In some aspects, the UE includes means for entering (e.g., using controller/processor 280, memory 282, or the like) a test mode based at least in part on receiving the request message. In some aspects, the UE includes means for generating (e.g., using controller/processor 280, memory 282, or the like) the UE assistance information message with the parameter set to the particular value.

In some aspects, the base station includes means for transmitting (e.g., using controller/processor 240, transmit processor 220, TX MIMO processor 230, MOD 232, antenna 234, memory 242, or the like), to a UE, a request message indicating that the UE is to set a parameter of a UE assistance information message to a particular value, where the particular value indicates a preference for the parameter that is unrelated to an actual preference of the UE; and/or means for receiving (e.g., using antenna 234, DEMOD 232, MIMO detector 236, receive processor 238, controller/processor 240, memory 242, or the like), from the UE and based at least in part on the request message, the UE assistance information message having the parameter set to the particular value. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for receiving (e.g., using antenna 234, DEMOD 232, MIMO detector 236, receive processor 238, controller/processor 240, memory 242, or the like) a response message providing confirmation that the UE is to set the parameter of the UE assistance information message to the particular value. In some aspects, the base station includes means for determining (e.g., using controller/processor 240, memory 242, or the like) whether the UE assistance information message is in conformance with a standard.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may transmit UE assistance information (UAI) to a base station, and the base station may configure the UE in accordance with one or more parameters identified in the UE assistance information (or the base station may ignore one or more of the parameters). UE assistance information can be used to transition a UE out of a radio resource control (RRC) connected state, for example, when the UE does not expect to send or receive data in the near future. UE assistance information may identify one or more power saving parameters that are being requested, or that are preferred, by a UE. The inclusion of a parameter in UE assistance information is optional. If a particular parameter is omitted, a base station may determine that a UE has no preference for the parameter, if the UE has not previously reported a preference for the parameter, or determine that the parameter has not changed from a previously reported preference for the parameter.

A particular power saving feature may be associated with a group of UE assistance information parameters. A base station may configure a group of parameters indicated in UE assistance information independently of another group of parameters indicated in UE assistance information. In some examples, a parameter requested by a UE in UE assistance information may be subject to a prohibit timer. For example, each group of parameters may be associated with a respective timer, and each timer may range in time from 0 to about 30 seconds, or infinity.

UE assistance information may identify a group of parameters relating to discontinuous reception (DRX), such as a DRX inactivity timer parameter, a long DRX cycle parameter, a short DRX cycle parameter, and/or a short DRX cycle timer, among other examples. Additionally, or alternatively, UE assistance information may identify a group of parameters relating to bandwidth, such as a maximum aggregated bandwidth (e.g., per frequency range, in uplink and/or in downlink) and/or a maximum quantity of carriers (e.g., in uplink and/or in downlink), among other examples. Additionally, or alternatively, UE assistance information may identify a group of parameters relating to MIMO, such as a quantity of MIMO layers (e.g., per frequency range, in uplink and/or in downlink), among other examples.

Additionally, or alternatively, UE assistance information may identify a group of parameters relating to cross-slot scheduling, such as a preferred timing value (k0) for a delay between a physical downlink control channel (PDCCH) and a physical downlink shared channel (PDSCH) scheduled by the PDCCH (e.g., per subcarrier spacing) and/or a preferred timing value (k2) for a delay between a PDCCH and a physical uplink shared channel (PUSCH) scheduled by the PDCCH (e.g., per subcarrier spacing). Additionally, or alternatively, UE assistance information may identify a group of parameters relating to an RRC connection release, such as a release request and/or a preferred RRC state after a release, among other examples.

For parameters relating to bandwidth, MIMO, and/or cross-slot scheduling, a UE may indicate any value up to a maximum UE capability or down to a minimum UE capability. For RRC connection release, a UE may request release with or without an RRC state preference for after release or may request to stay connected (no release).

A cellular conformance ecosystem, such as the Global Certification Forum (GCF) or PTCRB (a certification program established in 1997 by leading wireless operators to define test specifications and processes to ensure device interoperability on global wireless networks, as explained on the website, www.ptcrb.com/about/), may execute one or more test cases (e.g., the test cases identified in 3GPP Technical Specification 38.509) against a UE to verify that a protocol implementation in the UE meets the requirements defined by a telecommunication standard. A UE that meets the requirements may be certified for commercialization. A test case may include pseudo code that is implemented in Testing and Test Control Notation (TTCN).

In some cases, a feature of a telecommunication standard may be difficult to test. For example, a UE may transmit UE assistance information according to an implementation of power saving features that is particular to the UE (e.g., according to proprietary algorithms associated with a high level operating system or upper layer communication functions). That is, the UE transmits the UE assistance information by decision of the UE, and without a request from a base station. Thus, it is difficult to ascertain when a UE may transmit UE assistance information, and therefore there is no reliable outcome that is suitable for a test case. Accordingly, it is difficult to determine whether a UE's implementation of UE assistance information messaging is in conformance with applicable requirements.

As a result, a UE may transmit non-conforming UE assistance information to a base station. Power saving parameters that are requested by the UE in a non-conforming message may not be configured for the UE, and the UE may experience excessive power consumption, battery drain, and/or overheating. Moreover, the UE and the base station may expend computing resources processing non-conforming UE assistance information. In addition, because the UE's requested power saving parameters are not configured due to a non-conforming message, the UE may repeatedly transmit UE assistance information, which consumes significant network resources.

Some techniques and apparatuses described herein facilitate conformance testing of UE assistance information. In some aspects, a base station (e.g., a test system) may transmit a test command to a UE that triggers the UE to set contents of a UE assistance information message to a particular value, and triggers the UE to transmit the UE assistance information message. The test command may be a non-access stratum (NAS) over-the-air message that triggers the UE to transmit the UE assistance information message via RRC signaling. Accordingly, the base station may ascertain whether the UE assistance information message is in conformance with applicable requirements, thereby reducing the prevalence of non-conforming UE assistance information. In this way, computing resources used to process non-conforming messages may be conserved, network resources consumed by repeated transmission of non-conforming messages may be conserved, and power saving parameters may be configured for a UE with greater speed and efficiency.

Figure 3:
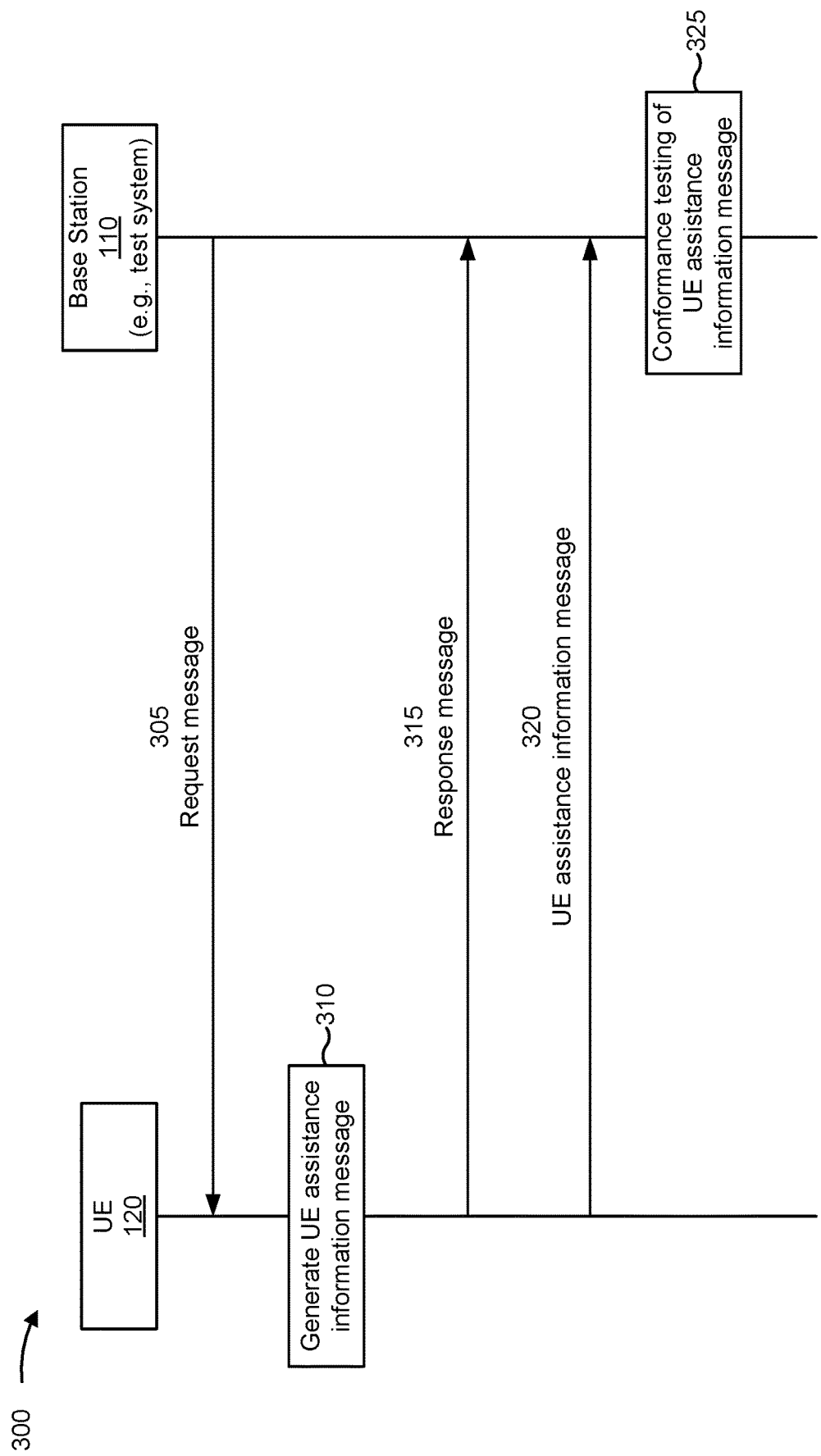
FIG. 3 is a diagram illustrating an example associated with conformance testing of UE assistance information, in accordance with the present disclosure.

FIG. 3 is a diagram illustrating an example 300 associated with conformance testing of UE assistance information, in accordance with the present disclosure. As shown in FIG. 3, example 300 includes communication between a base station 110 and a UE 120. In some aspects, the base station 110 may be, or may implement, a conformance testing system. The UE 120 and the base station 110 may communicate via a wireless connection (e.g., that simulates an access link between the UE 120 and an ordinary base station 110 that is not used for testing). The base station 110 may perform conformance testing of the UE 120 via the wireless connection. While example 300 is described in terms of a UE assistance information message, the techniques and apparatuses described herein may apply equally to any layer 3 (L3) message that is initiated by a UE. Moreover, in some aspects, the techniques and apparatuses described herein may apply to communication between the UE 120 and another UE 120 that is, or is implementing, a conformance testing system (e.g., that simulates a sidelink between the UE 120 and the other UE 120).

As shown by reference number 305, the base station 110 may transmit, and the UE 120 may receive, a request message indicating that the UE 120 is to set a parameter (e.g., an information element) of a UE assistance information message to a particular value (e.g., the UE 120 is to set a parameter of UE assistance information to the particular value). Thus, the request message may be referred to as a "set UAI request." The request message may be an over-the-air (OTA) message. For example, the request message may be a NAS test message (e.g., a NAS test command). The NAS test message may be a secure (e.g., ciphered) NAS test message.

In some aspects, the request message may indicate that the UE 120 is to set a preferred RRC state parameter (e.g., preferredRRC-State-r16), of a group of parameters relating to RRC connection release (e.g., ReleasePreference-r16) of a UE assistance information message, to the particular value. The preferred RRC state parameter may indicate an RRC state that is preferred by the UE 120 after release of an RRC connection. Thus, the particular value may identify one of an idle RRC state, an inactive RRC state, a connected RRC state, or an out of connected RRC state. In some aspects, the request message may indicate another parameter that the UE 120 is to set, such as a parameter relating to carrier aggregation, DRX, MIMO, cross-slot scheduling, bandwidth, connection release, and/or V2X sidelink.

In some aspects, the particular value for the parameter of the UE assistance information message may indicate a preference for the parameter that is unrelated to an actual preference of the UE 120 for the parameter. That is, the base station 110 may determine the particular value for the parameter without regard to the actual preference of the UE 120 (e.g., which may be unknown to the base station 110). The actual preference of the UE 120 may be based at least in part on a current heat level of the UE 120, battery level of the UE 120, and/or traffic pattern used by the UE 120, among other examples.

In some cases, the preference indicated by the particular value may be different from the actual preference of the UE 120. For example, the request message may indicate that the UE 120 is to identify, in a UE assistance information message, an idle RRC state as a preferred RRC state, even though an actual preferred RRC state of the UE 120 is an inactive RRC state. As another example, the request message may indicate that the UE 120 is to identify, in a UE assistance information message, four MIMO layers as a preferred quantity of MIMO layers, even though an actual preferred quantity of MIMO layers of the UE 120 is two MIMO layers. As a further example, the request message may indicate that the UE 120 is to identify, in a UE assistance information message, 10 subframes as a preferred long DRX cycle, even though an actual preferred long DRX cycle of the UE 120 is 8 subframes. As an additional example, the request message may indicate that the UE 120 is to identify, in a UE assistance information message, a V2X traffic periodicity of 600 milliseconds (ms), even though an actual preferred V2X traffic periodicity of the UE 120 is 400 ms. In some cases, the preference indicated by the particular value may be the same as the actual preference of the UE 120. However, this may occur merely by coincidence (e.g., the base station 110 does not select the particular value based on the actual preference of the UE 120).

In some aspects, the request message may include an information element (e.g., a "message type" information element) that identifies the request message as a set UAI request. For example, the information element may include an octet of bits that is set to a particular value to identify the request message. In some aspects, the request message may include an information element that indicates the particular value that the UE 120 is to use for the UE assistance information message. For example, the request message may include an information element (e.g., a "preferred RRC state" information element) that identifies a preferred RRC state for the UE 120. That is, the information element may indicate the particular value that the UE 120 is to use for the preferred RRC state parameter of the UE assistance information message. In some aspects, the information element may include an octet of bits, and two bits may be used to indicate the particular value. For example, a first combination of bits (e.g., 00) may indicate an idle RRC state; a second combination of bits (e.g., 01) may indicate an inactive RRC state; a third combination of bits (e.g., 10) may indicate a connected RRC state; and/or a fourth combination of bits (e.g., 11) may indicate an out of connected RRC state.

In some aspects, the request message may indicate that the UE 120 is to provide UE assistance information to an RRC subsystem of the UE 120 for relaying to one or more lower layers (e.g., a packet data convergence protocol (PDCP) layer, a radio link control (RLC) layer, a medium access control (MAC) layer, and/or a physical (PHY) layer). In some aspects, the UE 120 may enter a test mode based at least in part on receiving the request message. For example, the UE 120 may enter the test mode after processing the request message. In other words, the request message may cause the UE 120 to enter the test mode.

As shown by reference number 310, the UE 120 (e.g., using the RRC subsystem) may generate a UE assistance information message based at least in part on the request message. For example, the UE 120 may set a parameter of the UE assistance information message to the particular value indicated by the request message (e.g., the UE 120 may set a parameter of UE assistance information to the particular value). That is, the UE 120 may ignore (e.g., not indicate) an actual preference of the UE 120 when generating the UE assistance information message.

As an example, the UE 120 may set a preferred RRC state parameter (e.g., the preferredRRC-State-r16 parameter within the ReleasePreference-r16 information element) of the UE assistance information message to the particular value (e.g., idle, inactive, connected, or out of connected) indicated by the request message. In other words, the UE 120 may set the preferred RRC state parameter of the UE assistance information message to an equivalent value of the "preferred RRC state" information element of the request message. As described above, the particular value for the preferred RRC state parameter may indicate a preferred RRC state that is unrelated to an actual RRC state preferred by the UE 120. In some aspects, the UE 120 may generate the UE assistance information message, in accordance with the request message, based at least in part on a determination that the UE 120 is operating (e.g., currently operating) in an RRC connected state.

As shown by reference number 315, the UE 120 may transmit, and the base station 110 may receive, a response message indicating receipt of the request message. Thus, the response message may be referred to as a "set UAI response." In some aspects, the response message may provide confirmation that the UE 120 is setting a parameter of a UE assistance information message in accordance with the indication of the request message (e.g., the UE 120 is setting a parameter of UE assistance information in accordance with the indication). In some aspects, the UE 120 may transmit the response message if (e.g., based at least in part on a determination that) the UE 120 is operating (e.g., currently operating) in an RRC connected state.

The response message may be an OTA message. For example, the response message may be a NAS message, as described above. In some aspects, the response message may include an information element (e.g., a "message type" information element) that identifies the response message as a set UAI response. For example, the message type information element may include an octet of bits that is set to a particular value to identify the response message.

As shown by reference number 320, the UE 120 may transmit (e.g., in accordance with 3GPP Technical Specification 38.331), and the base station 110 may receive, the UE assistance information message generated by the UE 120. For example, the UE 120 may transmit the UE assistance information message having the parameter set to the particular value indicated by the request message. As an example, the UE 120 may transmit the UE assistance information message having the preferred RRC state parameter set to the particular value indicated by the request message. In some aspects, the UE assistance information message is an RRC message (e.g., the UE 120 may transmit the UE assistance information message via RRC signaling). In some aspects, when transmitting the UE assistance information message, the UE 120 may provide the generated UE assistance information message to lower layers (e.g., a PDCP layer, an RLC layer, a MAC layer, and/or a PHY layer) for transmission.

As shown by reference number 325, the base station 110 may perform conformance testing of the UE assistance information message (e.g., conformance testing of the release preference information element of the UE assistance information message). That is, the base station 110 may determine whether the UE assistance information conforms with a standard (e.g., according to a 3GPP technical specification) or another applicable requirement. For example, the base station may process (e.g., analyze) the UE assistance information message in order to determine whether the message is formatted properly, contains one or more specified information elements, contains one or more specified values, or the like.

Conformance testing of the UE assistance information is facilitated by on-demand triggering of the message, and by setting contents of the message to a predetermined value. In this way, the prevalence of non-conforming UE assistance information messages may be reduced. Accordingly, the techniques and apparatuses described herein conserve network resources and/or computing resources that may otherwise be used processing non-conforming messages, as well as improve the efficiency and speed at which power saving parameters are configured.

In some aspects, the UE 120 may exit the test mode subsequently to transmitting the UE assistance information message that indicates the particular value for the parameter. In some aspects, the UE 120 may transmit a UE assistance information message when the UE 120 is not in the test node. Here, the UE assistance information message may identify a value for the parameter that indicates an actual preference of the UE 120. In other words, the UE 120 may determine the value for the parameter based at least in part on the actual preference of the UE 120 and without regard to the particular value indicated by the request message.

As indicated above, FIG. 3 is provided as an example. Other examples may differ from what is described with respect to FIG. 3.

Figure 4:
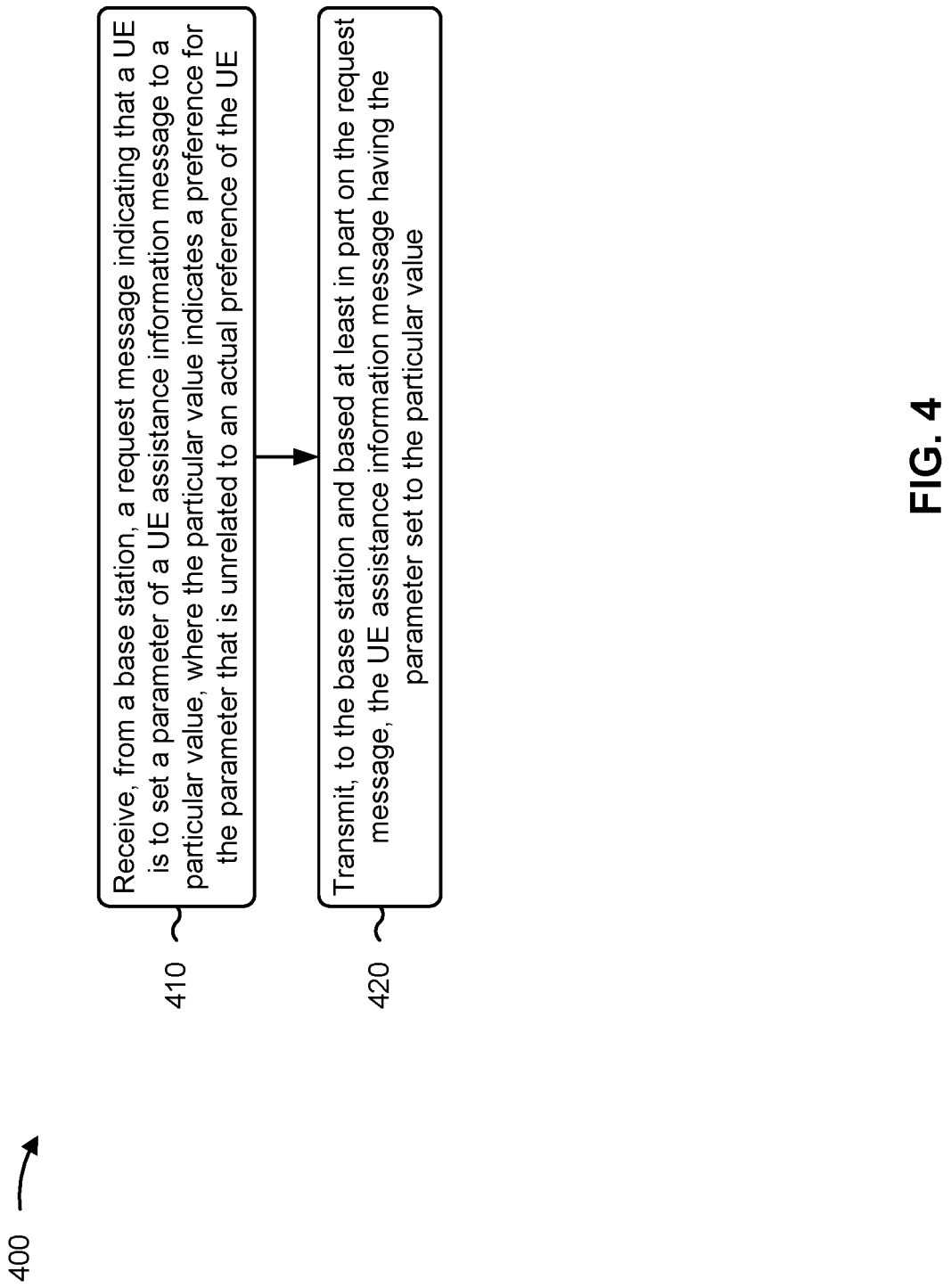
FIGS. 4-5 are diagrams illustrating example processes associated with conformance testing of UE assistance information, in accordance with the present disclosure.

FIG. 4 is a diagram illustrating an example process 400 performed, for example, by a UE, in accordance with the present disclosure. Example process 400 is an example where the UE (e.g., UE 120) performs operations associated with conformance testing of UE assistance information.

As shown in FIG. 4, in some aspects, process 400 may include receiving, from a base station, a request message indicating that a UE is to set a parameter of a UE assistance information message to a particular value, where the particular value indicates a preference for the parameter that is unrelated to an actual preference of the UE (block 410). For example, the UE (e.g., using reception component 602, depicted in FIG. 6) may receive, from a base station, a request message indicating that the UE is to set a parameter of a UE assistance information message to a particular value, as described above, for example, with reference to FIG. 3. In some aspects, the particular value indicates a preference for the parameter that is unrelated to an actual preference of the UE.

As further shown in FIG. 4, in some aspects, process 400 may include transmitting, to the base station and based at least in part on the request message, the UE assistance information message having the parameter set to the particular value (block 420). For example, the UE (e.g., using transmission component 604, depicted in FIG. 6) may transmit, to the base station and based at least in part on the request message, the UE assistance information message having the parameter set to the particular value, as described above, for example, with reference to FIG. 3.

Process 400 may include additional aspects, such as any single aspect or any combination of aspects described below and/or in connection with one or more other processes described elsewhere herein.

In a first aspect, process 400 includes transmitting a response message providing confirmation that the UE is to set the parameter of the UE assistance information message to the particular value.

In a second aspect, alone or in combination with the first aspect, process 400 includes entering a test mode based at least in part on receiving the request message.

In a third aspect, alone or in combination with one or more of the first and second aspects, process 400 includes generating the UE assistance information message with the parameter set to the particular value.

In a fourth aspect, alone or in combination with one or more of the first through third aspects, the request message is a NAS test message.

In a fifth aspect, alone or in combination with one or more of the first through fourth aspects, the NAS test message is an over-the-air message.

In a sixth aspect, alone or in combination with one or more of the first through fifth aspects, the UE assistance information message is an RRC message.

In a seventh aspect, alone or in combination with one or more of the first through sixth aspects, the UE assistance information message is transmitted based at least in part on a determination that the UE is operating in an RRC connected state.

In an eighth aspect, alone or in combination with one or more of the first through seventh aspects, the parameter is a preferred RRC state parameter.

In a ninth aspect, alone or in combination with one or more of the first through eighth aspects, the preferred RRC state parameter identifies an RRC state that is preferred by the UE after release of an RRC connection.

In a tenth aspect, alone or in combination with one or more of the first through ninth aspects, the particular value identifies one of an idle RRC state, an inactive RRC state, a connected RRC state, or an out of connected RRC state.

In an eleventh aspect, alone or in combination with one or more of the first through tenth aspects, the parameter includes one or more parameters related to carrier aggregation, discontinuous reception, MIMO communication, or V2X sidelink communication.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
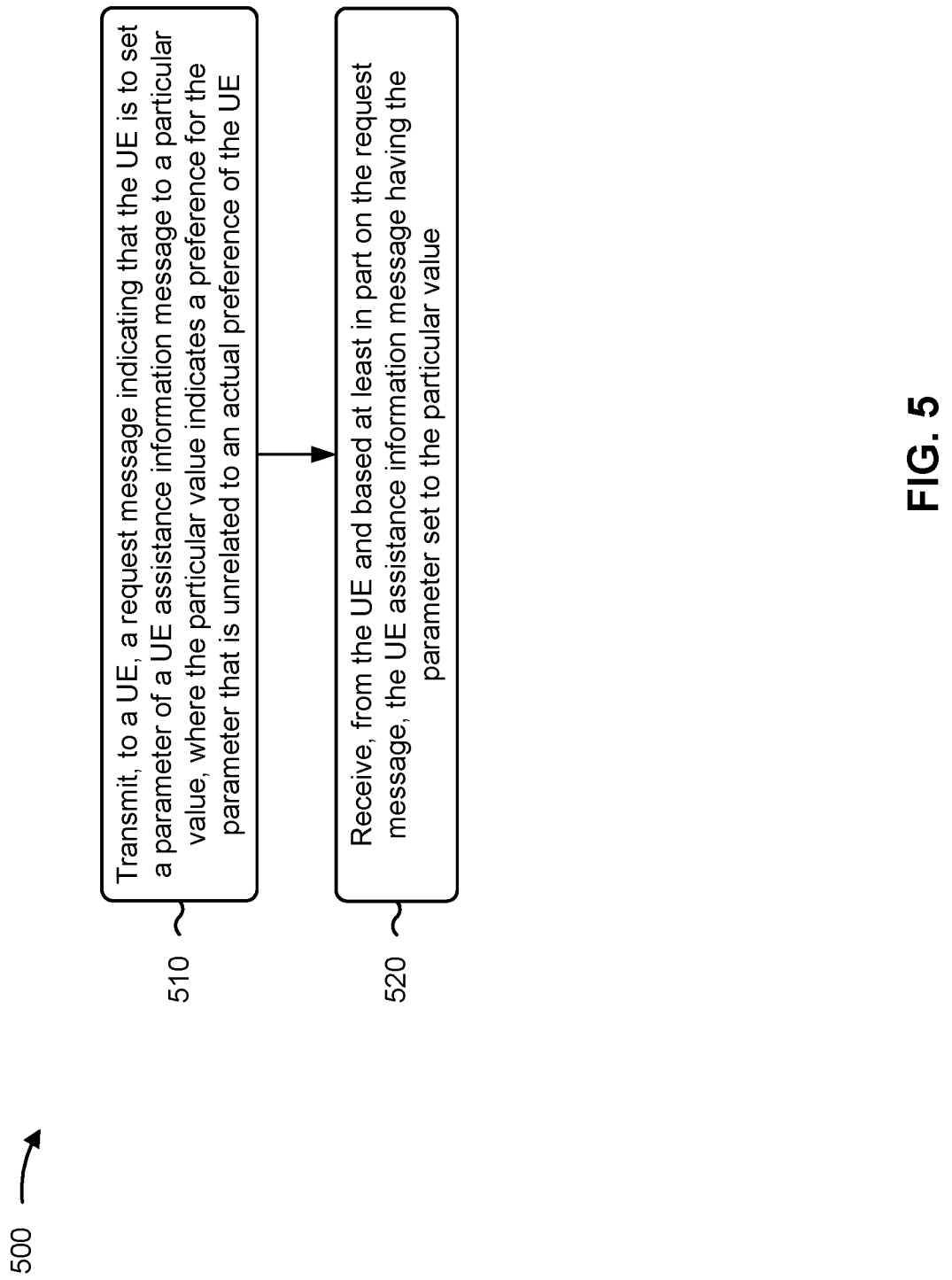

FIG. 5 is a diagram illustrating an example process 500 performed, for example, by a base station, in accordance with the present disclosure. Example process 500 is an example where the base station (e.g., base station 110) performs operations associated with conformance testing of UE assistance information.

As shown in FIG. 5, in some aspects, process 500 may include transmitting, to a UE, a request message indicating that the UE is to set a parameter of a UE assistance information message to a particular value, where the particular value indicates a preference for the parameter that is unrelated to an actual preference of the UE (block 510). For example, the base station (e.g., using transmission component 704, depicted in FIG. 7) may transmit, to a UE, a request message indicating that the UE is to set a parameter of a UE assistance information message to a particular value, as described above, for example, with reference to FIG. 3. In some aspects, the particular value indicates a preference for the parameter that is unrelated to an actual preference of the UE.

As further shown in FIG. 5, in some aspects, process 500 may include receiving, from the UE and based at least in part on the request message, the UE assistance information message having the parameter set to the particular value (block 520). For example, the base station (e.g., using reception component 702, depicted in FIG. 7) may receive, from the UE and based at least in part on the request message, the UE assistance information message having the parameter set to the particular value, as described above, for example, with reference to FIG. 3.

Process 500 may include additional aspects, such as any single aspect or any combination of aspects described below and/or in connection with one or more other processes described elsewhere herein.

In a first aspect, process 500 includes receiving a response message providing confirmation that the UE is to set the parameter of the UE assistance information message to the particular value.

In a second aspect, alone or in combination with the first aspect, process 500 includes determining whether the UE assistance information message is in conformance with a standard.

In a third aspect, alone or in combination with one or more of the first and second aspects, the request message is a NAS test message.

In a fourth aspect, alone or in combination with one or more of the first through third aspects, the NAS test message is an over-the-air message.

In a fifth aspect, alone or in combination with one or more of the first through fourth aspects, the UE assistance information message is an RRC message.

In a sixth aspect, alone or in combination with one or more of the first through fifth aspects, the UE assistance information message is received based at least in part on the UE operating in an RRC connected state.

In a seventh aspect, alone or in combination with one or more of the first through sixth aspects, the parameter is a preferred RRC state parameter.

In an eighth aspect, alone or in combination with one or more of the first through seventh aspects, the preferred RRC state parameter identifies an RRC state that is preferred by the UE after release of an RRC connection.

In a ninth aspect, alone or in combination with one or more of the first through eighth aspects, the particular value identifies one of an idle RRC state, an inactive RRC state, a connected RRC state, or an out of connected RRC state.

In a tenth aspect, alone or in combination with one or more of the first through ninth aspects, the parameter includes one or more parameters related to carrier aggregation, discontinuous reception, MIMO communication, or V2X sidelink communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
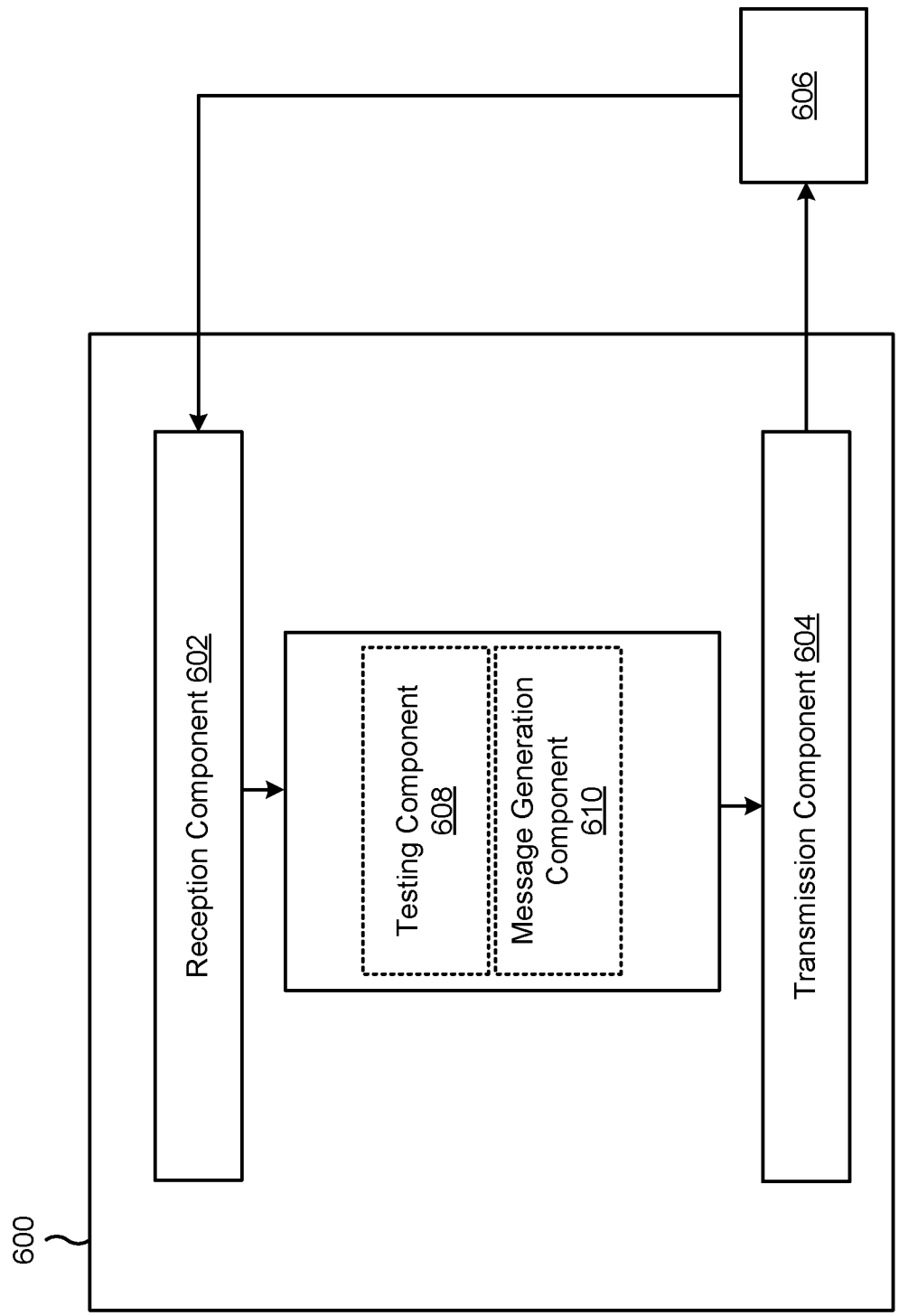

FIG. 6 is a diagram of an example apparatus 600 for wireless communication, in accordance with the present disclosure. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a testing component 608 or a message generation component 610, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4, or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive, from a base station, a request message indicating that the apparatus 600 is to set a parameter of a UE assistance information message to a particular value. In some aspects, the particular value indicates a preference for the parameter that is unrelated to an actual preference of the apparatus 600. The transmission component 604 may transmit, to the base station and based at least in part on the request message, the UE assistance information message having the parameter set to the particular value. The transmission component 604 may transmit a response message providing confirmation that the apparatus 600 is to set the parameter of the UE assistance information message to the particular value.

The testing component 608 may enter a test mode based at least in part on receiving the request message. The message generation component 610 may generate the UE assistance information message with the parameter set to the particular value.

The quantity and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

FIG. 7 is a diagram of an example apparatus 700 for wireless communication, in accordance with the present disclosure. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a testing component 708, among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The transmission component 704 may transmit, to a UE, a request message indicating that the UE is to set a parameter of a UE assistance information message to a particular value. In some aspects, the particular value indicates a preference for the parameter that is unrelated to an actual preference of the UE. The reception component 702 may receive, from the UE and based at least in part on the request message, the UE assistance information message having the parameter set to the particular value. The reception component 702 may receive a response message providing confirmation that the UE is to set the parameter of the UE assistance information message to the particular value. The testing component 708 may determine whether the UE assistance information message is in conformance with a standard.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving, from a base station, a request message indicating that the UE is to set a parameter of a UE assistance information message to a particular value, wherein the particular value indicates a preference for the parameter that is unrelated to an actual preference of the UE; and transmitting, to the base station and based at least in part on the request message, the UE assistance information message having the parameter set to the particular value.

Aspect 2: The method of Aspect 1, further comprising: transmitting a response message providing confirmation that the UE is to set the parameter of the UE assistance information message to the particular value.

Aspect 3: The method of any of Aspects 1-2, further comprising: entering a test mode based at least in part on receiving the request message.

Aspect 4: The method of any of Aspects 1-3, further comprising: generating the UE assistance information message with the parameter set to the particular value.

Aspect 5: The method of any of Aspects 1-4, wherein the request message is a non-access stratum (NAS) test message.

Aspect 6: The method of Aspect 5, wherein the NAS test message is an over-the-air message.

Aspect 7: The method of any of Aspects 1-6, wherein the UE assistance information message is a radio resource control message.

Aspect 8: The method of any of Aspects 1-7, wherein the UE assistance information message is transmitted based at least in part on a determination that the UE is operating in a radio resource control (RRC) connected state.

Aspect 9: The method of any of Aspects 1-8, wherein the parameter is a preferred radio resource control (RRC) state parameter.

Aspect 10: The method of Aspect 9, wherein the preferred RRC state parameter identifies an RRC state that is preferred by the UE after release of an RRC connection.

Aspect 11: The method of Aspect 9, wherein the particular value identifies one of an idle RRC state, an inactive RRC state, a connected RRC state, or an out of connected RRC state.

Aspect 12: The method of any of Aspects 1-8, wherein the parameter includes one or more parameters related to carrier aggregation, discontinuous reception, multiple-input multiple-output communication, or vehicle-to-everything sidelink communication.

Aspect 13: A method of wireless communication performed by a base station, comprising: transmitting, to a user equipment (UE), a request message indicating that the UE is to set a parameter of a UE assistance information message to a particular value, wherein the particular value indicates a preference for the parameter that is unrelated to an actual preference of the UE; and receiving, from the UE and based at least in part on the request message, the UE assistance information message having the parameter set to the particular value.

Aspect 14: The method of Aspect 13, further comprising: receiving a response message providing confirmation that the UE is to set the parameter of the UE assistance information message to the particular value.

Aspect 15: The method of any of Aspects 13-14, further comprising: determining whether the UE assistance information message is in conformance with a standard.

Aspect 16: The method of any of Aspects 13-15, wherein the request message is a non-access stratum (NAS) test message.

Aspect 17: The method of Aspect 16, wherein the NAS test message is an over-the-air message.

Aspect 18: The method of any of Aspects 13-17, wherein the UE assistance information message is a radio resource control message.

Aspect 19: The method of any of Aspects 13-18, wherein the UE assistance information message is received based at least in part on the UE operating in a radio resource control (RRC) connected state.

Aspect 20: The method of any of Aspects 13-19, wherein the parameter is a preferred radio resource control (RRC) state parameter.

Aspect 21: The method of Aspect 20, wherein the preferred RRC state parameter identifies an RRC state that is preferred by the UE after release of an RRC connection.

Aspect 22: The method of Aspect 20, wherein the particular value identifies one of an idle RRC state, an inactive RRC state, a connected RRC state, or an out of connected RRC state.

Aspect 23: The method of any of Aspects 13-19, wherein the parameter includes one or more parameters related to carrier aggregation, discontinuous reception, multiple-input multiple-output communication, or vehicle-to-everything sidelink communication.

Aspect 24: An apparatus for wireless communication at a device, comprising a processor; memory coupled with the processor; and instructions stored in the memory and executable by the processor to cause the apparatus to perform the method of one or more Aspects of Aspects 1-12.

Aspect 25: A device for wireless communication, comprising a memory and one or more processors coupled to the memory, the memory and the one or more processors configured to perform the method of one or more Aspects of Aspects 1-12.

Aspect 26: An apparatus for wireless communication, comprising at least one means for performing the method of one or more Aspects of Aspects 1-12.

Aspect 27: A non-transitory computer-readable medium storing code for wireless communication, the code comprising instructions executable by a processor to perform the method of one or more Aspects of Aspects 1-12.

Aspect 28: A non-transitory computer-readable medium storing a set of instructions for wireless communication, the set of instructions comprising one or more instructions that, when executed by one or more processors of a device, cause the device to perform the method of one or more Aspects of Aspects 1-12.

Aspect 29: An apparatus for wireless communication at a device, comprising a processor; memory coupled with the processor; and instructions stored in the memory and executable by the processor to cause the apparatus to perform the method of one or more Aspects of Aspects 13-23.

Aspect 30: A device for wireless communication, comprising a memory and one or more processors coupled to the memory, the memory and the one or more processors configured to perform the method of one or more Aspects of Aspects 13-23.

Aspect 31: An apparatus for wireless communication, comprising at least one means for performing the method of one or more Aspects of Aspects 13-23.

Aspect 32: A non-transitory computer-readable medium storing code for wireless communication, the code comprising instructions executable by a processor to perform the method of one or more Aspects of Aspects 13-23.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 13-23.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the memory and the one or more processors configured to:
      receive, from a base station, a request message indicating a particular value to which the UE is to set a parameter of UE assistance information,
         wherein the request message indicates for the UE to set the parameter of the UE assistance information to the particular value that indicates a preference for the parameter that is unrelated to an actual preference of the UE; and
      transmit, to the base station, a UE assistance information message having the parameter set to the particular value indicated by the request message received from the base station.

2. The UE of claim 1, wherein the memory and the one or more processors are further configured to:
   transmit a response message providing confirmation that the UE is setting the parameter to the particular value.

3. The UE of claim 2, wherein the response message is transmitted if the UE is operating in a radio resource control (RRC) connected state.

4. The UE of claim 2, wherein the parameter is a preferred radio resource control (RRC) state parameter.

5. The UE of claim 4, wherein the preferred RRC state parameter identifies an RRC state that is preferred by the UE.

6. The UE of claim 4, wherein the particular value identifies one of an idle RRC state, an inactive RRC state, a connected RRC state, or an out of connected RRC state.

7. The UE of claim 1, wherein the memory and the one or more processors are further configured to:
enter a test mode based at least in part on receiving the request message.

8. The UE of claim 1, wherein the memory and the one or more processors are further configured to:
generate the UE assistance information message with the parameter set to the particular value.

9. The UE of claim 1, wherein the request message is a non-access 9 stratum (NAS) test message, and
wherein the NAS test message is an over-the-air message.

10. The UE of claim 1, wherein the UE assistance information message is a radio resource control (RRC) message.

11. The UE of claim 1, wherein the parameter includes one or more parameters related to carrier aggregation, discontinuous reception, multiple-input multiple-output communication, or vehicle-to-everything sidelink communication.

12. A method of wireless communication performed by a user equipment (UE), comprising:
receiving, from a base station, a request message indicating a particular value to which the UE is to set a parameter of UE assistance information,
wherein the request message indicates for the UE to set the parameter of the UE assistance information to the particular value that indicates a preference for the parameter that is unrelated to an actual preference of the UE; and
transmitting, to the base station, a UE assistance information message having the parameter set to the particular value indicated by the request message received from the base station.

13. The method of claim 12, further comprising:
transmitting a response message providing confirmation that the UE is setting the parameter to the particular value.

14. The method of claim 13, wherein the response message is transmitted if the UE is operating in a radio resource control (RRC) connected state.

15. The method of claim 13, wherein the parameter is a preferred radio resource control (RRC) state parameter.

16. The method of claim 15, wherein the preferred RRC state parameter identifies an RRC state that is preferred by the UE.

17. The method of claim 15, wherein the particular value identifies one of an idle RRC state, an inactive RRC state, a connected RRC state, or an out of connected RRC state.

18. The method of claim 12, further comprising:
entering a test mode based at least in part on receiving the request message.

19. The method of claim 12, further comprising:
generating the UE assistance information message with the parameter set to the particular value.

20. The method of claim 12, wherein the request message is a non-access stratum (NAS) test message, and
wherein the NAS test message is an over-the-air message.

21. The method of claim 12, wherein the UE assistance information message is a radio resource control (RRC) message.

22. An apparatus for wireless communication, comprising:
means for receiving, from a base station, a request message indicating a particular value to which the apparatus is to set a parameter of user equipment (UE) assistance information,
wherein the request message indicates for the apparatus to set the parameter of the UE assistance information to the particular value that indicates a preference for the parameter that is unrelated to an actual preference of the apparatus; and
means for transmitting, to the base station a UE assistance information message having the parameter set to the particular value indicated by the request message received from the base station.

23. The apparatus of claim 22, further comprising:
means for transmitting a response message providing confirmation that the apparatus is setting the parameter to the particular value.

24. The apparatus of claim 23, wherein the response message is transmitted if the apparatus is operating in a radio resource control (RRC) connected state.

25. The apparatus of claim 23, wherein the parameter is a preferred radio resource control (RRC) state parameter.

26. The apparatus of claim 25, wherein the preferred RRC state parameter identifies an RRC state that is preferred by the apparatus.

27. The apparatus of claim 25, wherein the particular value identifies one of an idle RRC state, an inactive RRC state, a connected RRC state, or an out of connected RRC state.

28. A non-transitory computer-readable medium storing a set of instructions for wireless communication, the set of instructions comprising:
one or more instructions that, when executed by one or more processors of a user equipment (UE), cause the UE to:
receive, from a base station, a request message indicating a particular value to which the UE is to set a parameter of UE assistance information,
wherein the request message indicates for the UE to set the parameter of the UE assistance information to the particular value that indicates a preference for the parameter that is unrelated to an actual preference of the UE; and
transmit, to the base station, a UE assistance information message having the parameter set to the particular value indicated by the request message received from the base station.

29. The non-transitory computer-readable medium of claim 28, wherein the one or more instructions, when executed by the one or more processors of the UE, further cause the UE to:
transmit a response message providing confirmation that the UE is setting the parameter to the particular value.

30. The non-transitory computer-readable medium of claim 28, wherein the parameter is a preferred radio resource control (RRC) state parameter.

* * * * *